United States Patent
Epping

(10) Patent No.: US 10,624,492 B2
(45) Date of Patent: Apr. 21, 2020

(54) CLEANING SYSTEM

(71) Applicant: CUP & CINO Kaffeesystem-Vertrieb GmbH & Co. KG, Hövelhof (DE)

(72) Inventor: Frank Josef Paul Epping, Hövelhof (DE)

(73) Assignee: CUP & CINO Kaffeesystem—Vertrieb GmbH & Co. KG, Hövelhof (DE)

( * ) Notice: Subject to any disclaimer, the term of this patent is extended or adjusted under 35 U.S.C. 154(b) by 99 days.

(21) Appl. No.: 15/862,674

(22) Filed: Jan. 5, 2018

(65) Prior Publication Data

US 2018/0192818 A1    Jul. 12, 2018

(30) Foreign Application Priority Data

Jan. 9, 2017  (EP) .................................. 17150697

(51) Int. Cl.
*A47J 31/60* (2006.01)
*A47J 31/46* (2006.01)

(52) U.S. Cl.
CPC ............... *A47J 31/60* (2013.01); *A47J 31/46* (2013.01)

(58) Field of Classification Search
CPC .................................. A47J 31/46; A47J 31/60
See application file for complete search history.

(56) References Cited

U.S. PATENT DOCUMENTS

| | | | |
|---|---|---|---|
| 2013/0087582 A1* | 4/2013 | Wing | G01F 11/24 222/240 |
| 2015/0027315 A1* | 1/2015 | Lussi | A47J 31/42 99/285 |

(Continued)

FOREIGN PATENT DOCUMENTS

| | | |
|---|---|---|
| DE | 102014215689 A1 | 2/2016 |
| EP | 2695555 A1 | 2/2014 |

OTHER PUBLICATIONS

European Search Report (dated Mar. 9, 2017) far corresponding European App. EP 17 15 0697.

*Primary Examiner* — Benjamin L Osterhout
(74) *Attorney, Agent, or Firm* — WRB-IP LLP

(57) ABSTRACT

Method of cleaning of a milk system with dispensing device, which system is associated with a beverage maker, including a control unit and a cleaning module. The method includes the following steps: replacing a milk container of the milk system with the cleaning module, including at least two zones, cleaning fluid being filled in a first zone and in a second zone, and a cleaning agent being filled in a chamber; connecting the first zone and the second zone with docking units of the milk system for suctioning cleaning fluid, conveying the cleaning fluid through the milk system and at least partial recirculation of the cleaning fluid in the cleaning module; rinsing of the milk system with cleaning fluid, cleaning fluid being conveyed through the milk system out of the first zone and/or out of the second zone of the cleaning module and being led out; rinsing of the circuit of the milk system, cleaning fluid being extracted from the second zone, being heated by a heating device and being led back into the chamber, whereby it reaches the second zone via a fluid-conductive connection; terminating the circuit rinsing, cleaning fluid being led out and a valve device of the second zone being closed when the filling level of cleaning fluid in the second zone drops below a predetermined level; and final rinsing of the milk system with cleaning fluid from the first zone. Furthermore a device for carrying out the method is described.

16 Claims, 2 Drawing Sheets

(56) References Cited

U.S. PATENT DOCUMENTS

2015/0150410 A1* 6/2015 Ratterman ............ A47J 31/402
  426/590
2015/0230653 A1* 8/2015 Cheng .................... A47J 31/46
  426/433
2017/0039797 A1* 2/2017 Elmery ............... G07F 17/0071

* cited by examiner

CLEANING SYSTEM

BACKGROUND AND SUMMARY

This invention relates to a method and a device for cleaning of a milk system, which is associated, for example, with a beverage maker.

For the preparation of beverages, such as, for example, coffee and chocolate, there are a multitude of devices available, ranging from manual system to fully automatic machine. The delicacies able to be produced using a beverage maker include drinks containing milk such as cappuccino, latte macchiato or café latte, requiring milk and/or milk foam for preparation. The milk is generally stored in a corresponding device, for example a milk container, which is integrated into a beverage maker or is associated with a beverage maker and is connectible thereto via a feed system. Starting from the milk container, the milk, via supply devices and possibly processing devices, is heated and foamed, for example, and, together with a coffee or chocolate drink, is dispensed at an outlet.

All elements which come into contact with milk in such a system must be cleaned regularly in order to fulfill the required hygienic standards. Thereby desirable is a possible automated cleaning process which is quick, safe and independent of operating personnel that leads to the desired reproducible cleaning result.

Known from DE 10 2014 215 689 is a device and a method for cleaning a feed unit for milk in a beverage dispensing device, whereby disposed in the feed unit, besides a milk container, are a cleaning agent tank filled with cleaning agent and an extraction pump connected thereto. For a cleaning mode, the milk container is replaced with a cleaning mixture tank into which the cleaning agent is transferred. In addition, or alternatively, fresh water can be led into the mixture container in order to provide a cleaning solution of a particular concentration or a rinsing solution for a cleaning mode. The cleaning solution is discharged and soiled system elements are rinsed by means of the feed unit of the beverage dispensing device.

Disadvantageous with this method is that the cleaning with cleaning agent and the rinsing with fresh water take place via the same mixture container. This requires time since, for example, the cleaning agent tank must first be completely emptied before a change of rinsing fluid is possible. Above and beyond this, a large quantity of fresh water is used. Furthermore the system does not provide for any checking as to whether a cleaning has in fact taken place. An unintentional contamination of the milk with cleaning agent can occur so that it is possible for a contaminated beverage to be prepared.

It is desirable to simplify the cleaning of a milk system associated with a beverage maker, of shortening the required cleaning time, of designing in a way that is reproducible for a user, of reducing the error proneness and of making possible a monitoring.

A method according to an aspect of the invention for cleaning a milk system, in particular associated with a beverage maker, is provided comprising the following steps, that first a milk container is replaced by a cleaning module having at least two zones, whereby cleaning fluid is filled in a first zone and in a second zone and a cleaning agent is filled in a chamber.

First and second zones are at least partially in fluid-conductive connection to one another depending upon the level of filling of the filled cleaning fluid. There follows a connection of the first zone and the second zone with docking units of the milk system for suctioning of cleaning fluid, conveying of the cleaning fluid through the milk system and leading back of the cleaning fluid into the cleaning module. After the connection, the milk system is rinsed with cleaning fluid, cleaning fluid being conveyed through the milk system out of the first zone and/or out of the second zone of the cleaning module. There follows a circuit rinsing of the milk system, cleaning fluid being withdrawn from the second zone, being heated by means of a heating device and being led back into the chamber, whereby it reaches the second zone via a fluid-conductive connection. The circuit rinsing is terminated after a predefined cleaning cycle. Afterwards there follows a final rinsing of the milk system with cleaning fluid which is withdrawn from the first zone.

Provided for, according to the invention, is that the cleaning fluid filled into the first and second zones is fresh water.

Through releasing of the cleaning fluid into a third zone or a drip tray, for example, which is already provided as an element of the beverage maker, the filling level drops in the second zone. If a predetermined low filling level is reached, a valve device of the second zone closes, and cleaning fluid, for example cold fresh water, is withdrawn from the first zone for the final rinsing.

This method combines in itself several advantages. In particular the first rinsing with fresh water can be carried out quickly, without heating capacity being applied. A heating device integrated in the beverage container is advantageously used in particular for the circuit rinsing, preferably a thick film heating element. This thick film heating element with its advantageous thermal characteristics makes possible a combined cold-hot cleaning method. Proven advantageous has also been a stepwise increasing concentration of cleaning agent in the cleaning fluid, so that an optimal cleaning can take place with simultaneous prevention of milk deposit and an effective elimination of milk fat. Furthermore, with the method and the device still to be described, a docking system of the milk container can also be cleaned from the outside in which milk deposits would otherwise remain. The circuit rinsing likewise saves resources.

It has proven advantageous that the switching between individual rinsing steps can take place without control. The switching over takes place according to the filling level, for example when the filling level of the cleaning fluid filled in the first and second zones has dropped in such a way that between the first and the second zone no fluid-conductive connection exists. Likewise a switching over to final rinsing takes place when the filling level causes a closing of the valve device in the second zone, which is preferably designed as float valve.

Provided for is that the existing milk container is replaced with a cleaning module according to the invention, the latter being pushed into a correspondingly designed housing so that in its final position the cleaning module is in fluid-conductive connection with provided docking units and further connecting means. The presence and exact position of the cleaning module can be detected by a mechanical, RFID, Hall, Reed or similar sensor and transmitted to a provided control unit in order to start the cleaning process. This automatic detection prevents a malfunction and is thus especially user-friendly.

Furthermore a monitoring can also be provided in order to verify that the drip tray, into which the cleaning fluid is conducted during the final cleaning, is removed and cleaned before the system is enabled again for beverage preparation.

At the beginning of the cleaning method according to the invention, a supply of cleaning fluid, in particular fresh water, takes place from at least one of the first and/or second zones of the cleaning module. At least a portion of the cleaning fluid from the first zone and/or second zone of the cleaning module is thereby suctioned in a first rinsing step. It is preferably provided for that first and second zones are at least partially connected in a fluid-conductive way. If the filling level sinks to a certain level during withdrawal of fresh water, the fluid-conductive connection between first and second zone is interrupted; the first rinsing step ends.

Alternatively valve devices can be provided in the fluid-conductive connections, which valve devices are opened and/or closed by means of a control unit in order to control the withdrawal of the cleaning fluid.

This phase of the cleaning method serves the purpose of thorough rinsing of the components to be cleaned whereby lacteal calculus accumulation is preferably prevented through cold fresh water, which accumulation is to be observed in particular with a rinsing with hot water. During this first phase, also referred to as pre-rinsing, in particular a portion of the stored fresh water is withdrawn and led out, whereby alternatively it can be led out into the drip tray or an existing third zone.

In a following step, the cleaning fluid withdrawn from the second zone is conducted in the circuit, i.e. it is suctioned from the second zone and led back into the chamber with the cleaning agent, from where it again reaches the second zone. When the led-back cleaning fluid arrives in the chamber, it absorbs the cleaning agent stored there. For example, stored in the chamber is a cleaning agent concentrate, in particular a cleaning tablet, which gradually releases cleaning components into the led back cleaning fluid. The concentration of the cleaning components in the cleaning fluid conducted in the circuit thereby changes, which cleaning fluid is also designated in the following as cleaning or rinsing solution. From the chamber, the cleaning or rinsing solution with a changed proportion of cleaning components reaches the second zone and forms there a reservoir of cleaning fluid. Through the conducting of the cleaning fluid into the chamber and a thereby accompanying dynamic flow movement, the cleaning components are thereby mixed advantageously with the cleaning or respectively rinsing solution, and in particular a cleaning component provided as a solid can dissolve to a large extent without residue.

The cleaning or rinsing solution conducted in the circuit can preferably be heated in this phase of the cleaning method by means of a heating element, preferably with a heating element based on thick film technology. In particular the cleaning or rinsing solution conducted in the circuit can be heated to a defined temperature, which, with a view to the hygienic effect to be achieved, amounts to at least 70° C. to 80° C. With the circulation of the cleaning or rinsing solution, this heating can be carried out in an especially energy-saving way. Moreover short cleaning times result in an advantageous way, during which cleaning times the milk system to be cleaned cannot be used in its normal operational mode.

In a further step of the cleaning method, the circuit mode is terminated, whereby the cleaning and rinsing solution is led into the existing third zone of the cleaning module or alternatively into the existing drip tray of the beverage maker. The third zone or respectively the drip tray thus provide a collecting container for the cleaning or respectively rinsing solution to be led out of the system and discarded. After a certain cleaning time, whereby the cleaning fluid is heated and, containing cleaning agent, is conducted in the circuit, the cleaning fluid is led into the third zone or respectively into the drip tray, whereby the fluid level in the second zone drops. Starting from a certain low fluid level, an existing valve device, preferably designed as float valve, closes off the cleaning fluid supply from the second zone, whereby automatically fresh water is suctioned out of the first zone, which fresh water is conducted into the third zone or alternatively into the drip tray. The existing heating element is switched off, so that the now lower temperature of the fresh water indicates a final rinse.

To check an obtained cleaning effect of the cleaning method, the conductance for the cleaning or respectively rinsing solution is determined. For this purpose, a conductance sensor is provided, preferably in the suction region of the pump, within the circuit of the cleaning or respectively rinsing solution, which sensor measures the actual electrolytic conductivity of the conveyed fluid and thereby gives information about the nature of the fluid or respectively its contamination level. Moreover it can be thereby verified which fluid is located in the pipe system. The conductance sensor can transmit signals to a control unit in order to indicate whether a cleaning operation has been successfully run. If the cleaning has been incomplete, in particular if the required standards of hygiene have not been met, the entire system can be blocked. This offers a reliable check for the operating personnel.

The method according to the invention comprises as means a cleaning module for a milk system with a dispensing device, which is associated with a beverage maker, in particular a coffee machine. Also understood thereby is an independent cleaning module, however, which is designed as stand-alone system.

The cleaning module according to the invention for a milk system with a dispensing device, for example a discharge head, comprises a cleaning container for receiving cleaning fluid, whereby the cleaning container has at least two zones. Furthermore the cleaning module has connection means, so that the at least two zones are connectible to the milk system in a fluid-conductive way such that cleaning fluid is able to be extracted, is able to be conveyed through the milk system and is able to be led back at least partially into the cleaning module. The compact cleaning module is easily manageable, so that also its cleaning can take place without any problems.

The milk system or respectively the beverage maker comprises at least in part a system of pipes or lines, at least one conveying device and a dispensing device, storage containers and possibly an air enrichment element as well as at least one heating element and a control unit.

With the cleaning module according to the invention, a cleaning of a milk system in connection with a beverage maker can take place, in particular a cleaning of those system components which are in direct contact with milk, whether they are supply devices, processing devices or dispensing devices for suctioning, conveying, preparing and dispensing of milk taken from at least one milk container. In particular it is also foreseen that interfaces, i.e. for example docking units and dispensing devices, are able to be cleaned both from the inside as well as also from the outside. Especially advantageous thereby is that the discharge head of a beverage maker no longer has to be disassembled in order to be cleaned since, according to the invention, it can be cleaned both from the inside as well as from the outside.

The cleaning module is connectible in a simple way to the milk system of a beverage maker; in particular, a milk container disposed in a housing can be replaced with the cleaning module. Existing connection and suction means for suctioning milk out of the milk container and conveying milk in the system of lines are connectible to the cleaning module in such a way that now a provided cleaning fluid is suctioned out of the cleaning module by the suction means and is conveyed through those system components of the milk system which are in contact with milk, and is at least partially led back.

In being exchanged with the milk container, the cleaning module can, for example, be inserted into the housing and can be connected to the connection means of the milk system in a fluid-conductive way. For example, the docking units provided within the framework of the milk system and possibly further existing connection means can be used e.g. for a leading back, whereby a flawless connection is facilitated.

The cleaning module has a plurality of zones, preferably a first and a second zone, which are at least partially connected to one another in a fluid-conductive way. In one embodiment, the cleaning module can comprise three zones, whereby preferably at least one of the three zones is designed as a separate and detachable container. Furthermore the cleaning module can comprise a detachable element on which the docking units and further connecting means are provided. This multipartite feature facilitates a cleaning of the individual parts of the cleaning module, as well as a replacement of individual elements, for example.

The cleaning module stores cleaning fluid at least in a first and in a second zone, whereby in the second zone a chamber is also provided in which a cleaning agent can be filled, and which is connected to the second zone in a fluid-conductive way. In a phase of the cleaning method, cleaning fluid can be led back into the chamber of the second zone, whereby this cleaning fluid overflows into the second zone and thus is able to be conducted into the circuit. After termination of the circulation phase, the cleaning fluid is collected, for example in the existing third zone, which provides a collection container for waste water, or alternatively in the drip tray. Preferably such a collection container is designed in a way that is detachable from the cleaning module, so that the cleaning fluid captured therein can be discarded.

Filled into the first zone and into the second zone of the cleaning module can be fresh water as cleaning fluid, and cleaning agent can be filled into the chamber at the beginning of the cleaning method. First and second zones are connected to one another in a fluid-conductive way at least partially, depending upon the filling level, or respectively separated from one another to the extent that there is pure fresh water in the first zone.

The cleaning module is preferably designed in such a way that, via a cleaning head connected to the dispensing device and a recirculation line into at least the chamber, the cleaning fluid at this dispensing device of the milk system is able to be led back into the third zone of the cleaning module or into the drip tray. The cleaning head is preferably designed in such a way that a rinsing of the dispensing device by the cleaning fluid is possible from the inside and from the outside. A cleaning head is thereby disposed on the dispensing device; for example it is connected thereto by means of magnets on the discharge side of the dispensing device. The disposed cleaning head is designed in such a way that the inside and outside of the dispensing device is preferably rinsed by a cleaning fluid in turbulent flow. Through the design of the cleaning head, an intensive cleaning is possible, whereby the cleaning fluid flows out of the dispensing device completely, for example through an outlet opening, provided at the lowest point of the dispensing device.

The cleaning module thus comprises at least two zones, designed, for example, as containers connectible to one another which can be filled with different media independently of one another. The media comprise fluids, for example fresh water or cleaning fluid, and/or solids, for example a cleaning tablet (cleaning tab). First and second zones are connected at least partially in a fluid-conductive way depending upon the filling level; for example first and second zones are partially separated from one another by a partition. The first and the second zone of the cleaning module are thereby in fluid-conductive connection to a suction side of the suction means, for example with the conveying device of the milk system. In particular the suction means comprise at least two fluid-conductive connections for the first and the second zone. The chamber and possibly the third zone are in fluid-conductive connection at least indirectly with the discharge side of the suction means.

The cleaning module comprises valve devices in the fluid-conductive connections of the first and of the second zones. Preferred are float valves which close depending upon the filling level.

First and second zones can be filled manually with cleaning fluid, preferably cold fresh water. A manual filling is advantageous compared with an automatic filling taking place within the milk system or respective in an associated beverage maker since at least no fresh water connection and further components have to be provided. Thus there exists a certain independence as regards the peripheral equipment. Furthermore a manual filling is able to be carried out in a shorter time than a filling by means of an integrated pump.

Stored in the chamber, formed in the second zone of the cleaning module, is a cleaning agent, for example in the form of a concentrate or respectively in the form of a cleaning tablet. The filling of the chamber with cleaning agent can likewise take place manually, which is less prone to error and is above and beyond that verifiable. This chamber is in fluid-conductive connection with the second zone of the cleaning module. Preferably the cleaning fluid is led back from the dispensing device of the milk system via the cleaning head connected there and the included recirculation line into the chamber of the second zone, whereby it is possibly enriched there with cleaning agent. In particular the cleaning fluid led back into the chamber reaches the second zone via a line or an overflow in order to be led in circulation during a phase of the cleaning method. This leading back or recirculation has proven to be especially water-saving.

Furthermore, in one embodiment, there is a recirculation line, having a valve, connectible to the third zone or alternatively to the drip tray so that recirculated, used cleaning fluid can be collected which is no longer fed into the recirculation cycle and is dischargeable in a simple way.

The cleaning module according to the invention is used to clean a milk system integrated in a beverage maker or associated therewith. A beverage maker is in particular a coffee machine, comprising at least one conveying device with a suction line on the suction side and an outlet line on the discharge side of the conveying device. Fluid is thus able to be suctioned via the suction line and is able to be conveyed via the conveying device and the outlet line to a dispensing device, designed in particular as a discharge head.

Moreover the device for cleaning can have furthermore valves, pumps, heating elements and/or a conductance sensor.

BRIEF DESCRIPTION OF THE DRAWINGS

Further preferred features and preferred embodiments will be explained in the following with reference to embodiment examples and the figures. Shown thereby are.

DETAILED DESCRIPTION

Figure 1:
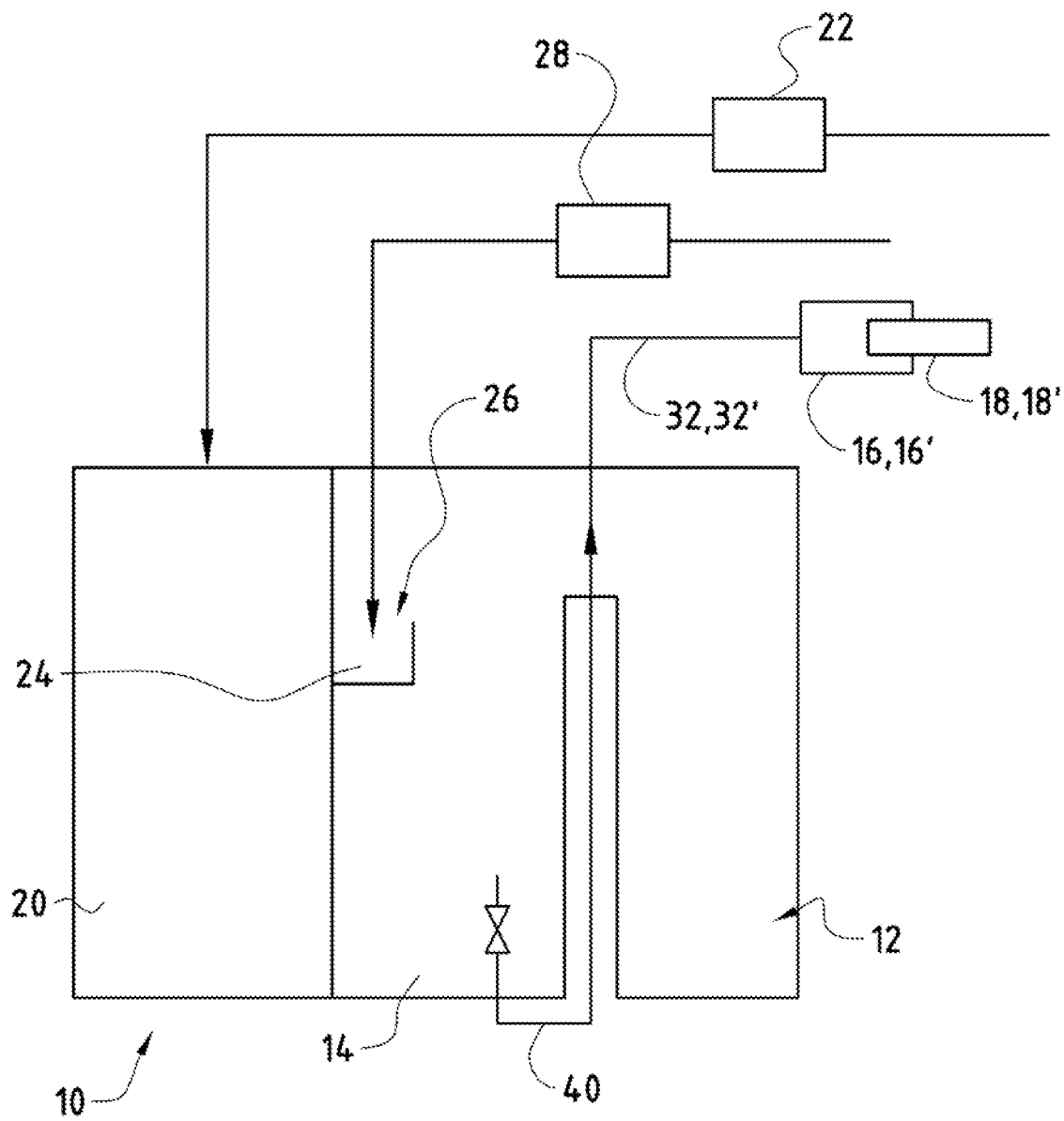
FIG. 1, a schematic view of a cleaning module according to the invention.

Shown schematically in FIG. 1 is an embodiment example of a cleaning module 10 according to the invention. In the embodiment example, the cleaning module 10 is divided into zones, which are formed at least partially by containers connectible to one another. Included is a first zone 12 and a second zone 14, which are filled with cleaning fluid, preferably fresh water, before start of a cleaning process. The fresh water provides a rinsing solution for a first cleaning phase and for a final rinsing. The fresh water stored in the second zone 14 is used in particular for a recirculation.

First and second zones 12, 14 are connectible in a fluid-conductive way to a suction side of at least one conveying device of a milk system or respectively of a beverage maker (not shown). Provided in particular are connection means 16, 16', which are connectible to docking units 18, 18' of the milk system or respectively of the beverage maker. The connection means 16, 16' can be designed in such a way that a rinsing of the docking units 18, 18' of the milk container can also take place from the outside. Connection lines 32, 32' to the individual zones extend to the connection means 16, 16'.

Provided furthermore in the cleaning module 10 in the embodiment shown is a third zone 20, which is connectible by means of a connection piece 22 to a return line (not shown). Formed in the second zone 14 is a chamber 24 which is connectible in a fluid-conductive way to the second zone 14. In particular an overflow element 26 is provided so that cleaning fluid from the chamber 24 reaches the second zone 14. The chamber 24 is in fluid-conductive connection with a second connecting piece 28, by means of which the chamber 24 is connectible at least indirectly with a discharge side of the at least one conveying device.

Figure 2:
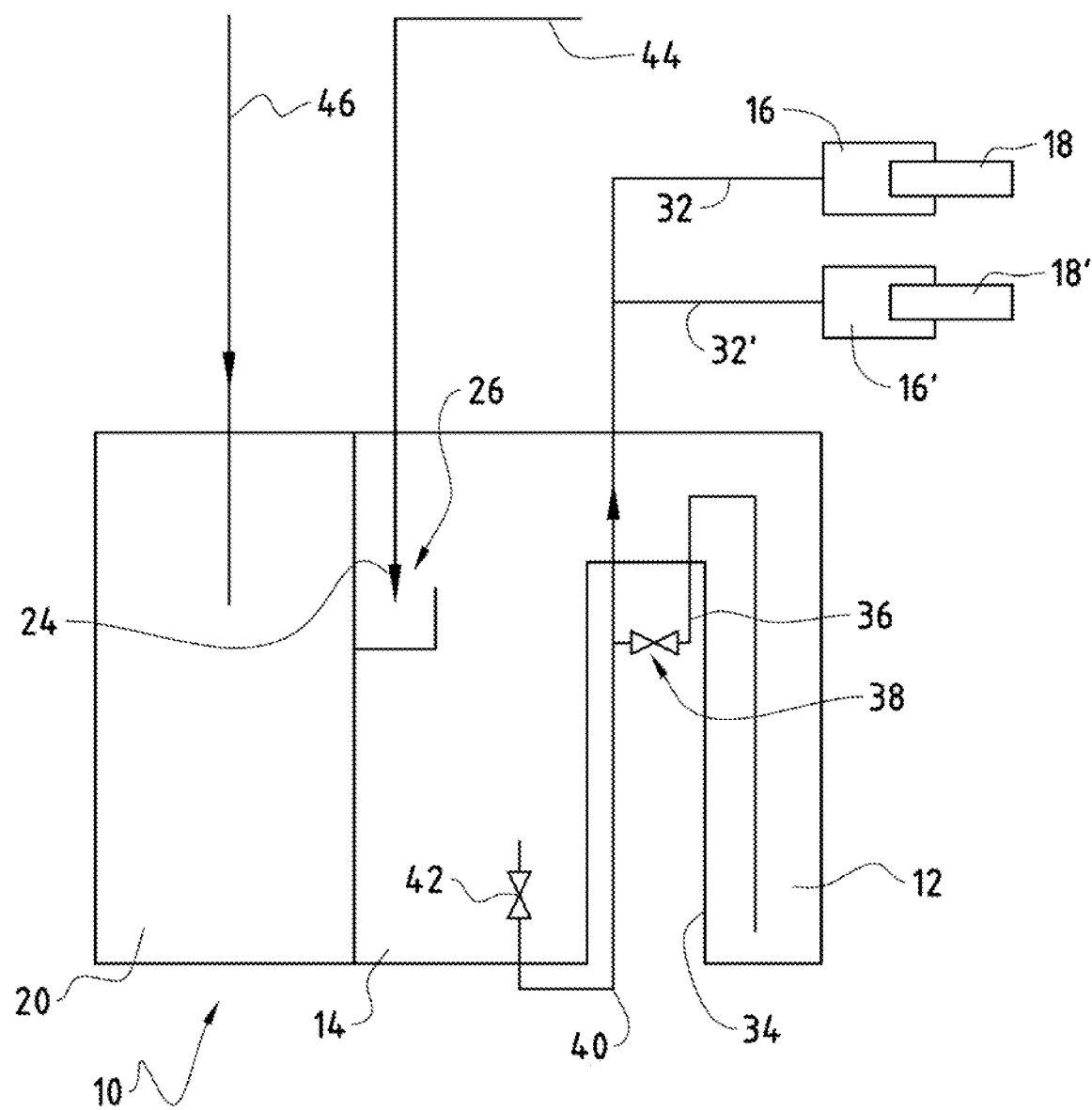
FIG. 2, a schematic view of a cleaning module according to the invention with fluid-conductive connections.

Shown in FIG. 2 are the fluid-conducting connections to the individual zones of the cleaning module 10. Starting from the docking units 18, 18', the connection lines 32, 32' extend, which provide a fluid-conductive connection to the first zone 12 and to the second zone 14, i.e. connect these zones to the at least one conveying device (not shown). Shown furthermore is that stored cleaning fluid from the first zone 12 is connected to the connection lines 32, 32' at a connecting piece 38 via a suction port 34 and a valve device 36. Likewise leading to the connecting piece 38 is a fluid-conducting connection 40, starting from the second zone 14 and comprising a valve device 42. The second valve device 42 is in particular designed as float valve, the fluid-conducting connection 40 being interrupted when a filling level in the second zone 14 has dropped below a certain level.

It can be learned furthermore from FIG. 2 that coming out into the chamber 24 formed in the second zone 14, is a recirculation line 44, via which cleaning fluid is recirculated and furthermore arrives via overflow 26 in the second zone 14, in order to be led again into the circuit. Stored in the chamber 24 is preferably a cleaning agent concentrate which gradually passes into the cleaning fluid through the rinsing of the chamber 24.

Also discernible in FIG. 2 is the third zone 20, which is likewise connectible to a second recirculation line 46 in a fluid-conductive way. The cleaning fluid conveyed into the third zone 20 via the second recirculation line 46 is collected in the third zone 20. This collected cleaning fluid can be emptied manually with removal of the cleaning module 10. The third zone 20 is preferably designed as detachable collection container.

The invention claimed is:

1. Method of cleaning of a milk system with dispensing device, which milk system is associated with a beverage maker, comprising a control unit and a cleaning module, having the steps:
   a) replacing a milk container of the milk system by the cleaning module, the cleaning module comprising at least two zones, cleaning fluid being filled in a first zone and in a second zone, and a cleaning agent being filled in a chamber;
   b) connecting the first zone and the second zone with docking units of the milk system for suctioning cleaning fluid, conveying the cleaning fluid through the milk system and at least partially recirculating the cleaning fluid in the cleaning module;
   c) rinsing the milk system with cleaning fluid, cleaning fluid being conveyed through the milk system out of the first zone and/or out of the second zone of the cleaning module and being led out;
   d) rinsing a circuit of the milk system, cleaning fluid being extracted from the second zone, being heated by a heating device and being led back into the chamber, whereby it reaches the second zone via a fluid-conductive connection;
   e) terminating the circuit rinsing, cleaning fluid being led out and a valve device of the second zone being closed when a filling level of cleaning fluid in the second zone drops below a determined level; and
   f) performing a final rinsing of the milk system with cleaning fluid from the first zone.

2. Method according to claim 1, wherein in step a) fresh water as cleaning fluid is filled in the first zone and second zone.

3. Method according to claim 1, wherein step c) is started by a control unit when a correct position of the cleaning module is transmitted by a sensor to the control unit.

4. Method according to claim 3, wherein the comprising measuring conductance of the cleaning fluid and transmitting measured conductance data to the control unit.

5. Method accenting to claim 4, wherein a switchover from step c) to step d) takes place as a function of the measured conductance.

6. Cleaning module for a milk system with a dispensing device, associated with a beverage maker, the cleaning module having at least first and second zones for receiving cleaning fluid, the at least first and second zones being connectible to the milk system by fluid-conductive connections such that cleaning fluid is able to be withdrawn from the cleaning module, is able to be conveyed through the milk system and is able to be led back into the cleaning module at least partially.

7. Cleaning module according to claim 6, wherein in the second zone a chamber is formed and is connected to the second zone by a fluid-conductive connection.

8. Cleaning module according to claim 6, wherein in the second zone a chamber is formed and is connected to the second zone by a fluid-conductive connection, wherein the cleaning module is exchangeable with a milk container of the milk system and is connectible in a fluid-conductive way with docking units of the milk system, cleaning fluid being extractable out of at least the first zone and the second zone and being able to be led back at least partially into the chamber, and wherein the cleaning module is exchangeable with a milk container of the milk system and is connectible in a fluid-conductive way with docking units of the milk system, cleaning fluid being extractable out of at least the first zone and the second zone and being able to be led back at least partially into the chamber.

9. Cleaning module according to claim 6, wherein fresh water as cleaning fluid is finable at, least into the first zone and into the second zone of the cleaning module.

10. Cleaning module according to claim 6, wherein at least one valve device is disposed in a fluid conductive connection to the first zone.

11. Cleaning module according to claim 6, wherein at least one valve device is disposed in a fluid conductive connection to the second zone, the at least one valve device being configured to close when a filling level of cleaning fluid in the second zone has fallen under a predetermined level.

12. Cleaning module according to claim 6, Wherein a cleaning agent is fillable into a chamber, whereby cleaning fluid flows into the chamber via a recirculation line and out of the chamber via a fluid-conveying connection into the second zone.

13. Cleaning module according to claim 6, wherein at the dispensing device of the milk system, via a cleaning head connectible thereto and a recirculation line, the cleaning fluid is able to be led back into a chamber.

14. Cleaning module according to claim 6, wherein cleaning fluid is able to be led out into a drip tray of the beverage maker.

15. Cleaning module according to claim 6, wherein cleaning fluid is able to be led back into a third zone, which is included in the cleaning module.

16. Cleaning module according to claim 15, wherein the third zone is designed as separable container.

* * * * *